United States Patent
Maxwell et al.

(10) Patent No.: US 10,040,588 B2
(45) Date of Patent: Aug. 7, 2018

(54) METHOD FOR SEALING A METAL CANS WITH PEELABLE LIDS AND DEVICE THEREFOR

(71) Applicant: Crown Packaging Technology, Inc., Alsip, IL (US)

(72) Inventors: Ian Maxwell, Berkshire (GB); John Pawel Bilko, Wiltshire (GB); Florian Christian Gregory Combe, Oxfordshire (GB)

(73) Assignee: Crown Packaging Technology, Inc., Alsip, IL (US)

( * ) Notice: Subject to any disclaimer, the term of this patent is extended or adjusted under 35 U.S.C. 154(b) by 1075 days.

(21) Appl. No.: 14/358,275

(22) PCT Filed: Oct. 8, 2012

(86) PCT No.: PCT/EP2012/069859
§ 371 (c)(1),
(2) Date: May 15, 2014

(87) PCT Pub. No.: WO2013/075877
PCT Pub. Date: May 30, 2013

(65) Prior Publication Data
US 2014/0334902 A1 Nov. 13, 2014

(30) Foreign Application Priority Data
Nov. 23, 2011 (EP) ...................................... 11190398

(51) Int. Cl.
*B65B 51/22* (2006.01)
*B65B 7/28* (2006.01)
(Continued)

(52) U.S. Cl.
CPC ............ *B65B 51/227* (2013.01); *B29C 65/46* (2013.01); *B65B 7/2878* (2013.01); *H05B 6/101* (2013.01);
(Continued)

(58) Field of Classification Search
CPC ....... B29C 65/46; B29C 65/76; B29C 66/112; B29C 66/131; B29C 66/53461;
(Continued)

(56) References Cited

U.S. PATENT DOCUMENTS 2,024,906 A * 12/1935 Bennett .................. H05B 6/362
219/607
3,840,138 A * 10/1974 Mohr ................. B21D 51/2676
219/635
(Continued)

FOREIGN PATENT DOCUMENTS

| GB | 490514 | 8/1938 |
|---|---|---|
| GB | 1207306 A | 9/1970 |

(Continued)

OTHER PUBLICATIONS

English translation of Japanese Patent Application No. 2014-542742: Office Action dated Dec. 21, 2016, 3 pages.

*Primary Examiner* — Jimmy T Nguyen
(74) *Attorney, Agent, or Firm* — Baker & Hostetler LLP (57) ABSTRACT

A method of sealing a peelable lid (2) to a flange (4) provided within a metal can body (1) which involves inserting an induction coil (6) into the can body to primarily heat the sealing surface (5) of the flange, while keeping the exterior wall of the can relatively cool to avoid tin reflow and decoration degradation of the exterior wall. The induction coil is subsequently removed from the can body and a peelable lid applied to the flange, whereby residual heat in
(Continued)

the flange aids the sealing of the lid to the flange, e.g. by allowing activation of a bonding material.

11 Claims, 6 Drawing Sheets (51) Int. Cl.

| | | |
|---|---|---|
| *B29C 65/46* | (2006.01) | |
| *H05B 6/44* | (2006.01) | |
| *H05B 6/10* | (2006.01) | |
| *H05B 6/38* | (2006.01) | |
| *B29C 65/76* | (2006.01) | |
| *B29C 65/00* | (2006.01) | |
| *B29L 22/00* | (2006.01) | |
| *B29L 31/56* | (2006.01) | |

(52) U.S. Cl.
CPC ............... *H05B 6/38* (2013.01); *H05B 6/44* (2013.01); *B29C 65/76* (2013.01); *B29C 66/112* (2013.01); *B29C 66/131* (2013.01); *B29C 66/53461* (2013.01); *B29C 66/723* (2013.01); *B29C 66/742* (2013.01); *B29C 66/8322* (2013.01); *B29L 2022/00* (2013.01); *B29L 2031/565* (2013.01)

(58) Field of Classification Search
CPC . B29C 66/723; B29C 66/8322; B65B 51/227; B65B 7/2878; H05B 6/101; H05B 6/103; H05B 6/38; H05B 6/44; B29L 2022/00; B29L 2031/565; B21D 51/2676
USPC ............... 413/5, 59; 219/635, 671, 672, 644
See application file for complete search history.

(56) References Cited

U.S. PATENT DOCUMENTS

| | | | |
|---|---|---|---|
| 5,218,178 A | | 6/1993 | Peysakhovich |
| 5,529,703 A | * | 6/1996 | Sprenger ................. B03C 1/253 219/604 |
| 2004/0031798 A1 | | 2/2004 | Fox et al. |
| 2009/0159591 A1 | * | 6/2009 | Tomita .................. B24B 49/105 219/628 |
| 2010/0107568 A1 | | 5/2010 | Inaba et al. |
| 2010/0108665 A1 | * | 5/2010 | Hirota ...................... C21D 1/10 219/600 |
| 2012/0111523 A1 | * | 5/2012 | Bochiechio ............ B22D 17/28 164/113 |

FOREIGN PATENT DOCUMENTS

| | | |
|---|---|---|
| JP | S57-199994 | 12/1982 |
| JP | 2002-102967 A | 9/2002 |
| WO | WO 93/16570 A1 | 8/1993 |

\* cited by examiner

(Prior Art)

METHOD FOR SEALING A METAL CANS WITH PEELABLE LIDS AND DEVICE THEREFOR

CROSS-REFERENCE TO RELATED APPLICATIONS

This application is the National Stage of International Application No. PCT/EP2012/069859, filed Oct. 8, 2012, which claims the benefit of EP application number 11190398.5, filed Nov. 23, 2011, the disclosures of which are incorporated herein by reference in their entirety.

TECHNICAL FIELD

The present invention relates to metal cans with peelable lids and more particularly to a method of sealing peelable lids to metal cans using induction heating.

BACKGROUND

Many containers used to hold food products have a peelable lid which is easily detached prior to first use of the product by a consumer. Such peelable lids act both to seal the dispensing aperture of the container as well as to provide a tamper evidence indicator. A peelable lid provides an easy method of opening a container without the need for separate tools, such as scissors or can openers.

Containers with peelable lids can be made from a variety of different materials including glass, cardboard, plastic and metal. Cardboard containers may be suitable for holding food products in some situations; however, in certain markets, for example countries with relatively hot and/or humid climates, cardboard containers may not be appropriate. Susceptibility to attack by pests (e.g. mice and rats) and their relative lack of strength may also make cardboard containers unsuitable for many uses. Plastic and glass containers are also prone to some of the same problems. Metal containers or "cans" address many of these issues.

Cans for use in specialised market segments, for example cans used in the infant formula market, are required to satisfy stringent safety standards. This can be a challenge when producing a metal can with a peelable, typically foil, lid. For example, it is required that a can used to hold infant formula powder maintain its hermetic seal with a peelable lid even when stored in excess of 3 months at high temperatures, such as 45° C., and with a pressure difference of 700 mbar (70 kPa) between the inside and outside of the can.

Typically, a hermetic seal between a peelable foil lid and an appropriately configured inwardly directed flange or lip of a metal can is made by first heating the sealing surface of the flange or lip. Either the sealing surface or an opposed sealing surface of the lid is coated with a bonding material, typically either a lacquer or a polymer. The foil lid is applied to the flange and a seal is achieved by applying a combination of heat and pressure (applied to the lid in situ).

Where the filled, sealed can is to be subsequently processed to cook or otherwise heat the contents, a polypropylene coating may be provided on the interior surface of the can and on the lidding material such that these "weld together" to form a hermetic seal. Seals provided in this way are able to withstand the rigours of processing, such as a combination of high temperature (typically 120° C. or more) and pressure acting on the lid.

Heating of the flange may be achieved using conduction heating or induction heating. In the case of conduction heating, heat is transferred to the metal can via direct contact with the can. In the case of induction heating, a high frequency alternating current is passed through an electromagnetic induction coil to produce an electromagnetic field. The coil is placed around the outside of the can such that the can, and in particular the area surrounding the flange, is situated within the axially induced electromagnetic field. The resulting eddy currents created in the flange and surrounding can area give rise to a rapid heating of the flange. Induction heating is generally advantageous as compared with conduction heating as heating times with the former are faster, and direct contact with the can is not required (such that various can shapes can be used with the same induction heating set up).

For some uses, it is desirable to provide the foil lid at a position part-way along the can body, thus separating the can body into two compartments. The (hermetically sealed) compartment beneath the foil lid is used to contain the food product, whilst the compartment above the lid may contain some other item, e.g. a plastic spoon. The top opening of the can may be closed with a plastic lid or the like. Particularly for cans of this configuration, the known heating schemes can cause noticeable damage to the exterior of the can due to the high temperatures that the exterior must be heated to, in order to raise the flange sealing surface to the temperature required to achieve a seal. Typically, as the flange will cool slightly between initial heating and application of the foil lid, the sealing surface must be heated significantly above the setting temperature. In addition, as heat is conducted from the exterior surface of the can to the flange, that exterior surface must in turn be heated to an excessive temperature. For a bonding material that operates at around 160° C., the flange needs to be heated to 200° C., during which the exterior surface can reach a temperature of 280° C. The temperature required at the exterior surface is such that tin reflow may occur, resulting in visible marking (i.e. discoloration) to the exterior surface.

One possible solution is to use a bonding material which operates at a lower temperature than those that have typically been used for this purpose, e.g. a bonding material that sets at 90° C., so that it is not necessary to excessively heat the exterior surface of the can. However, this would render the cans unsuitable for sale in markets with hot climates.

SUMMARY OF THE INVENTION

It is an object of the invention to overcome or at least mitigate the disadvantages of known induction heating systems of the type used in sealing a peelable lid within a can body.

According to a first aspect of the present invention there is provided a method of sealing a peelable lid to an inwardly projecting and circumferentially extending flange of a metal can body. The method comprises inserting an induction coil into the can body and passing an alternating current through the coil to heat the flange. The induction coil is then removed from the can body and a peelable lid applied to the flange, whereby residual heat in the flange seals or aids the sealing of the peelable lid to the flange.

An advantage of at least certain embodiments of the invention is that, whilst the flange can be heated to the required temperature, the exterior wall of the can is not "overheated" thereby preventing tin reflow at, and degradation of, the external surface.

The method may involve locating a further induction coil around the exterior of the can body and, substantially simultaneously with the step of passing an alternating current through the inner coil, passing an alternating current through the further coil to apply supplementary heat to the flange. The first and second coils may be energised together or separately.

In some embodiments, a bonding material may be applied between the peelable lid and the flange of the can. In other embodiments, a bonding material may be applied to the sealing surface of the flange prior to applying the peelable lid to the flange. In still further embodiments, a bonding material may be applied to the sealing surface of the peelable lid prior to applying the lid to the flange.

In some embodiments, the flange is located part way along the length of the can body such that sealing of the peelable lid to the flange separates the can body into upper and lower compartments.

According to a second aspect of the present invention there is provided a heating system for use in a can production line and comprising an induction coil for insertion into a can body and a power supply for energising the coil whilst it is within the can body.

The heating system may comprise a further coil for locating around the exterior of the can body, said power supply being configured to energise the further coil when it is around the can body. The first mentioned coil and said further coil may be mechanically coupled together to provide a single operating unit, i.e. such that a can body can be moved relative to the unit so as to move the coils into position with respect to the can body.

DETAILED DESCRIPTION

Figure 1:
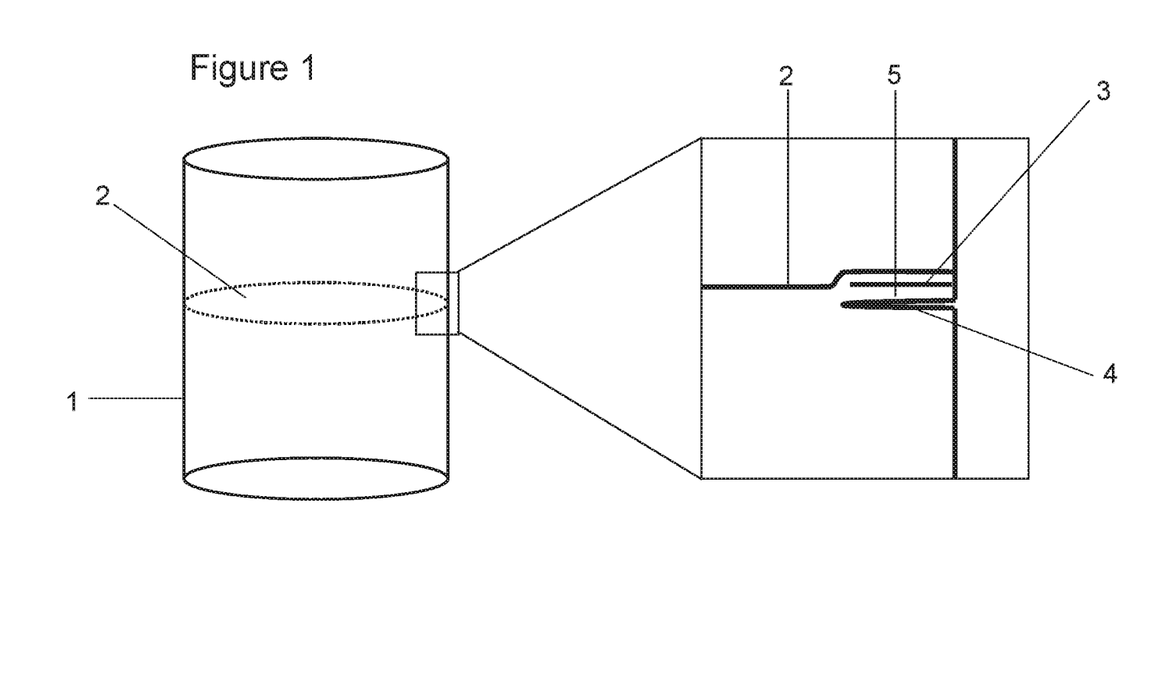
FIG. 1 illustrates schematically a metal can separated into two compartments by a peelable foil lid including, as inset, a detail showing a flange, sealing surface of the flange, bonding material and the peelable lid.

Sealed peelable lids provide consumers with an easy method of opening a container, providing both convenience and safety. Moreover, as illustrated in FIG. 1, peelable lids 2 can be used to separate a metal can body 1 into two separate compartments, where the can body 1 itself may be formed by folding a flat sheet and providing an axial weld or by punching a circular disc to form a cylinder with an integral base. The inset in FIG. 1 shows in detail a cross-section of the region where the lid seals to an upper sealing surface 5 of an inwardly projecting flange 4, by means of a bonding material 3. The can itself is typically made of tinplate, with the flange 4 being formed by pressing in a circular groove around the circumference of the can 1 and subsequently applying an axial compression force to the can 1 to collapse the groove. The lid 2 is typically formed of a metal foil or of a plastic or paper material.

Figure 2:
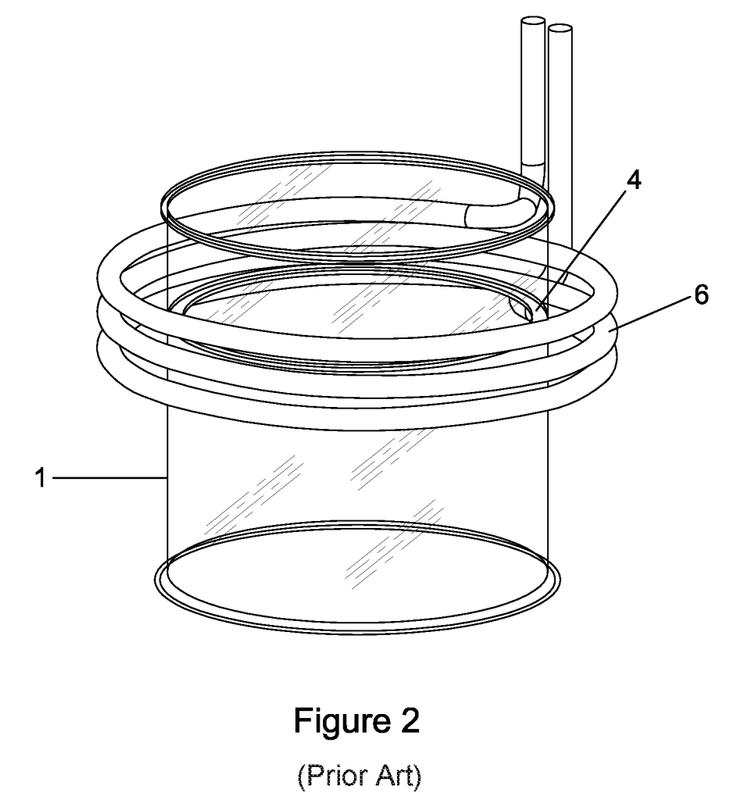
FIG. 2 is a perspective view of a metal can located within an induction coil for the purpose of heating a sealing flange.

As discussed previously, when sealing the lid 2 to the flange 4 of the can body 1, heat may be applied to the flange 4 using induction heating. Conventional approaches to induction heating, such as that illustrated in FIG. 2, which uses a single external coil 6, can however result in tin reflow on the exterior surface of the can or other effects that cause visible surface degradation. It is desirable to provide a method of sealing a peelable lid 2 to a flange 4 of a can body 1 which directs heat to the flange 4 whilst reducing the extent to which the exterior surface of the can is heated.

Figure 3:
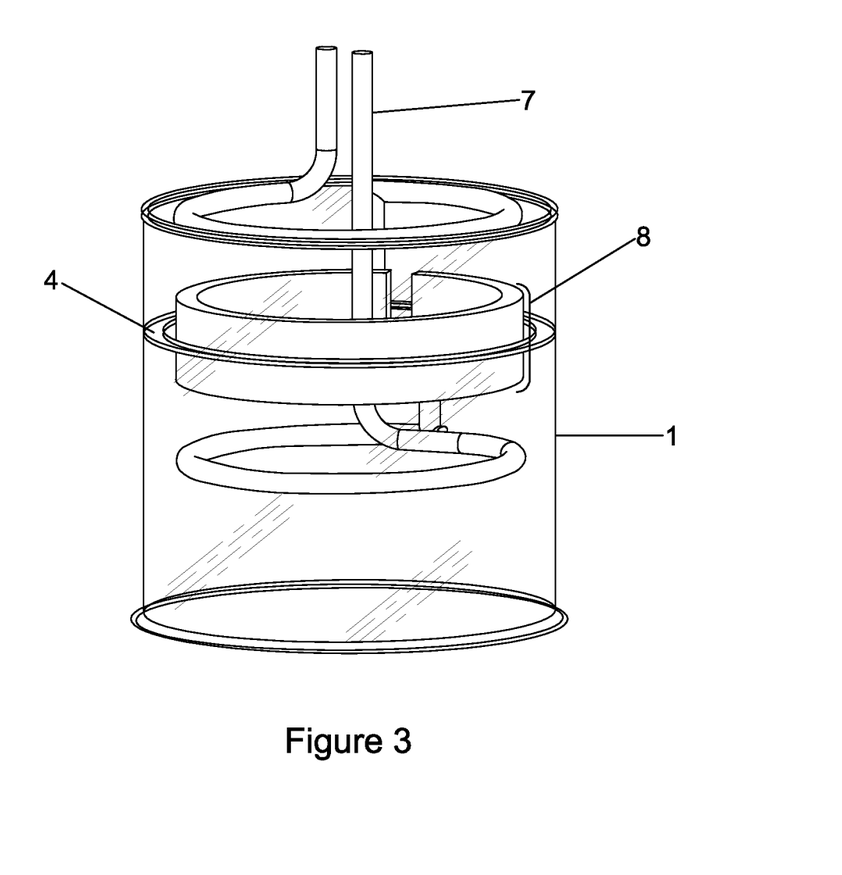
FIG. 3 is a perspective view of a flange heating system comprising an induction coil located within a metal can.

This is achieved using a flange heating system as illustrated in FIG. 3. The flange heating system comprises an induction coil 7. A can 1 is raised and lowered with respect to the flange heating system such that, during heating, the induction coil 7 is inserted within the metal can body 1, adjacent to the flange 4, and then removed from the can 1 after heating. Following insertion into the can, the gap between the coil and the flange is relatively small, e.g. on the order of 1 mm. This tolerance is sufficient to allow the coil to be moved into and out of the can at the high speeds necessary on a production line.

Contrary to established understanding and practise, it has been found that a coil inserted within a can 1, rather than around the outside of the can, is able generate sufficient heat in the surrounding can area to allow sealing of the lid 2 to the flange 4. In this way, this new method of induction heating is able to focus the heating effect on the inwardly projecting flange 4 whilst keeping the exterior wall at a lower temperature and thus preventing tin reflow and decoration degradation on the exterior wall.

Figure 4:
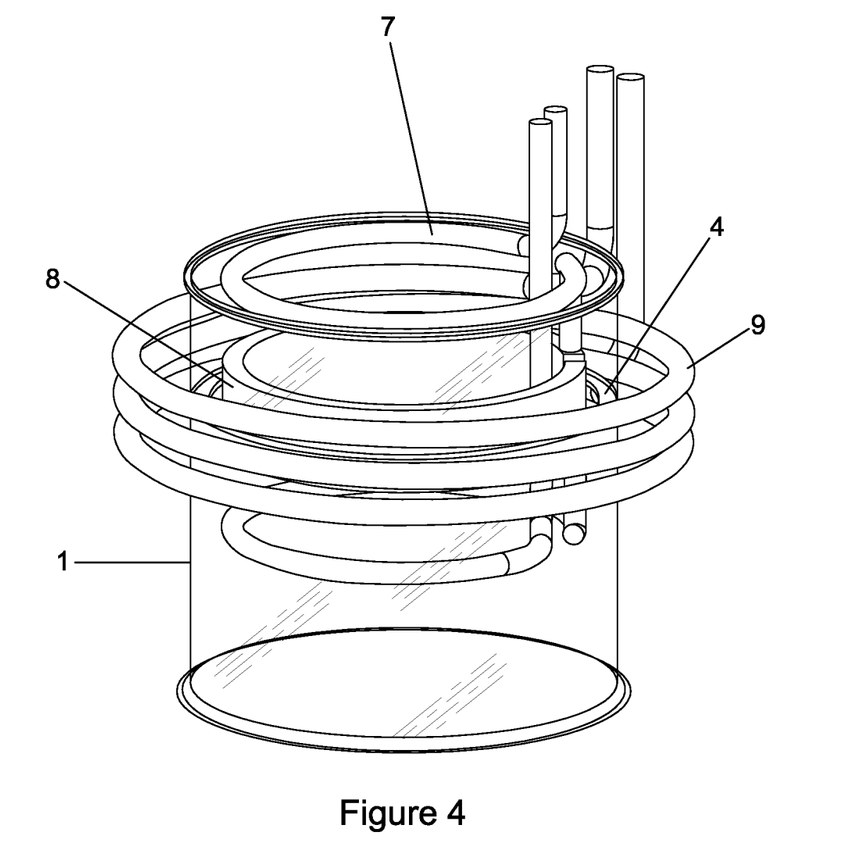
FIG. 4 is a perspective view of an alternative flange heating system comprising two induction coils, positioned within and outside of the can.

In a second embodiment, as illustrated in FIG. 4, the flange heating system comprises two separately energised induction coils, an internal coil 7 and an external coil 9, of which the internal coil 7 is positioned coaxially within the external coil 9. A can 1 is raised and lowered with respect to the flange heating system, such that during the heating of the flange 4, the internal 7 and external 9 induction coils are positioned adjacent to the flange 4, around the inner and outer circumference of the can 1 respectively. In this embodiment, the external induction coil 9 acts to heat the flange 4 via the external wall, up to a temperature which is below that which would otherwise cause tin reflow and decoration degradation. The additional heat required to bring the flange 4 to the desired temperature is induced by the internal induction coil 7. The electromagnetic fields from the external and internal induction coil overlap at the flange 4, causing a cumulative heating effect. This particular embodiment is envisaged to be employed in instances where it is necessary to heat the flange 4 at a particularly fast rate.

Figure 5:
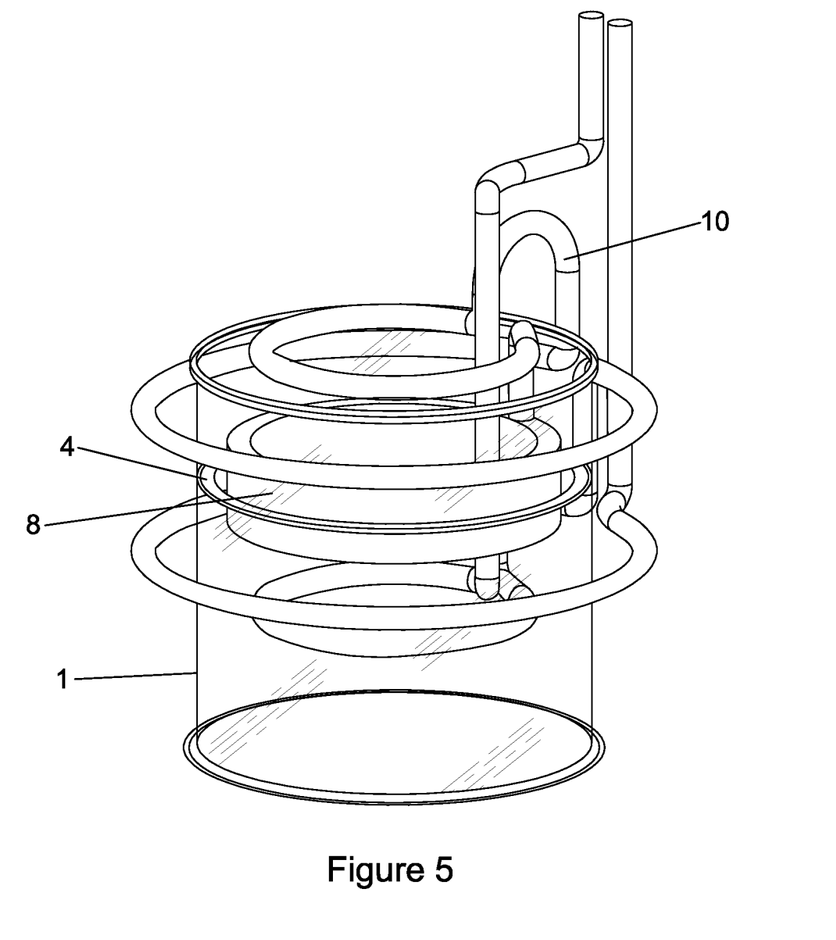
FIG. 5 is a perspective view of a further alternative flange heating system.

In a third embodiment, as illustrated in FIG. 5, the flange heating system comprises a single induction coil 10 with a set of "inner" turns and a set of "outer" turns. When the flange heating system is applied to a can 1, the inner turns of the coil are positioned inside the can 1 and the outer turns are positioned outside the can 1.

For all of the described embodiments, the design of the coils may be optimised to achieve this directed heating. This may include incorporating a copper plate 8 into the induction coil structure as shown in FIGS. 3, 4 and 5. As is known in the art, the coil may be cooled by allowing water to flow through a passage extending through the centre of the windings.

Figure 6:
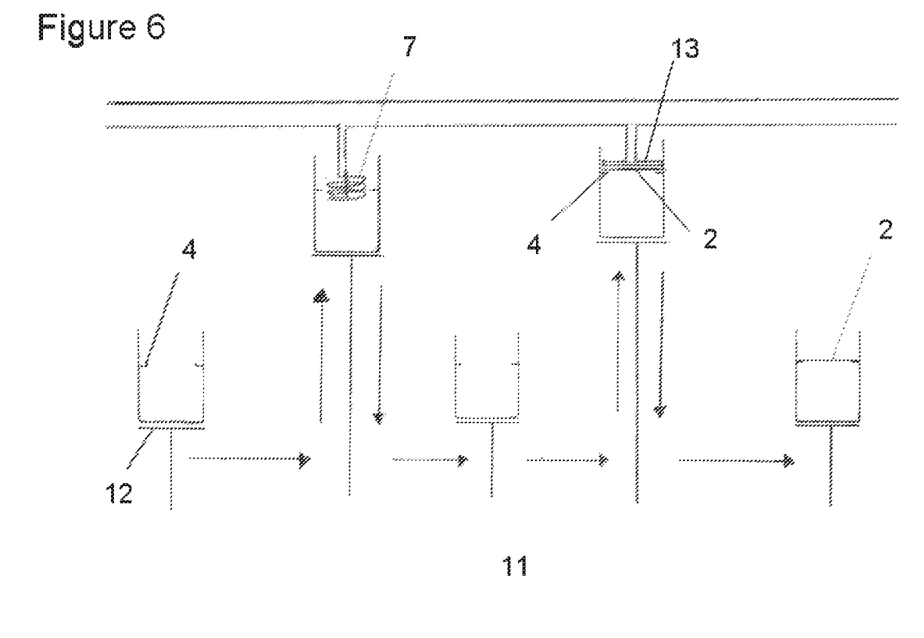
FIG. 6 illustrates schematically a production line used to hermetically seal foil lids to metal can bodies.

FIG. 6 illustrates schematically a production process for the heating and sealing of metal cans 1, using a flange heating system of the type described above (FIG. 3). The production process assumes that the can bodies 1 are open at both ends and that, after sealing of the foil lid 2, the can is filled through the remaining open end, after which that end is closed, e.g. with a seamable end. Of course, the process may be used to apply a foil lid 2 to an already filled can 1, provided that there is sufficient headspace to accommodate an induction coil within the can.

Considering the illustrated process further, the flange heating system is mounted above a conveyor transporting cans 1 through the production system, such that the coil extends downwards towards the conveyor. Each metal can 1 is held in place on a platform 12 which moves along the production line 11, raising and lowering the cans 1 appropriately. As it passes beneath the flange heating system, a can 1 is raised so that the induction coil is adjacent to the flange 4, and the coil energised by passing an alternating current through it (the coil may be switched on and off or may be in a permanently on state). The metal can 1 is held in a fixed position relative to the flange heating system for the duration of the induction heating process. In order to maximise production speed, the sealing surface 5 of the flange 4 is expected to reach the required temperature, for example 200° C., in the order of milliseconds. Once the required temperature is achieved, the flange heating system is removed from the can 1 by lowering the platform 12 on which the can 1 is placed. The metal can 1 is then moved to the next section of the production line 11, to a position beneath a lid holder 13. Each lid 2 is coated on the lower surface with an appropriate bonding material 3. The can 1 is again raised to a height at which the lower periphery of the lid 2 contacts the sealing surface 5 of the flange 4. Pressure applied between the peelable lid 2 and the sealing surface 5 of the flange 4, and the residual heat within the sealing surface 5, will cause the lid 2 to seal onto the flange 4, with the bonding material 3 setting in the process. The platform 12 is then lowered to disengage the can 1 from the lid holder 13 and is moved to the next stage of the production line 11.

If multiple sealed peelable lids 2 are to be provided within a single can 1, the process outlined above may be repeated along the production line 11.

It will be appreciated by the person of skill in the art that various modifications may be made to the above described embodiments without departing from the scope of the present invention. For example, in the case where the lid material is itself able to adhere to the flange 4 (e.g. where the lid is of a plastic or plastic coated material), there may be no need to provide a separate layer of bonding material 3 between the lid 2 and the flange 4.

The invention claimed is:

1. A can flange heating system in a can production line, the can flange heating system comprising an induction coil configured for insertion into a can body having an inwardly projecting flange, the induction coil including a first coil and a second coil that each extend at least partially circumferentially about an interior of the can body, the first coil configured to be positioned above the flange and the second coil being configured to be positioned below the flange when the induction coil is located within the can body; and a power supply adapted for energizing the induction coil while the induction coil is located within the can body.

2. The can flange heating system according to claim 1, wherein the induction coil is an internal induction coil, the heating system further comprising an external induction coil configured for locating around the exterior of the can body, said power supply being configured to energize the external induction coil when the external induction coil is located around the can body.

3. The can flange heating system according to claim 2, wherein said internal induction coil and said external induction coil are mechanically coupled together to provide a single operating unit.

4. The can flange heating system according to claim 2, wherein the internal induction coil is coaxial with the external induction coil.

5. The can flange heating system according to claim 1, wherein the induction coil further includes a copper plate positioned between the first coil and the second coil, such that when the induction coil is inserted into the can body the copper plate is adjacent to the flange.

6. A can production line comprising:
a can flange heating system comprising:
an induction coil configured for insertion into a can body having an inwardly projecting flange, the induction coil including a first coil and a second coil that each extend at least partially circumferentially about an interior of the can body, the first coil configured to be positioned above the flange and the second coil being configured to be positioned below the flange when the induction coil is inserted into the can body; and
a power supply adapted for energizing the induction coil while the induction coil is located within the can body.

7. The can production line according to claim 6, wherein the induction coil is an internal induction coil, the can flange heating system further comprising an external induction coil configured for locating around the exterior of the can body, the power supply being configured to energize the external induction coil when the external induction coil is located around the can body.

8. The can production line according to claim 7, wherein the internal induction coil and the external induction coil are mechanically coupled together to provide a single operating unit.

9. The can production line according to claim 7, wherein the internal induction coil is coaxial with the external induction coil.

10. The can production line according to claim 6, wherein the induction coil further includes a copper plate positioned between the first coil and the second coil, such that when the induction coil is inserted into the can body the copper plate is adjacent to the flange.

11. The can production line according to claim 6, further comprising a platform, the can flange heating system being mounted above the platform, the platform being configured to raise and lower the can body such that when the can body is raised the induction coil is located within the can body.

* * * * *